United States Patent [19]
Ohnishi et al.

[11] Patent Number: 5,278,813
[45] Date of Patent: Jan. 11, 1994

[54] OPTICAL RECORDING/REPRODUCING APPARATUS WITH LIGHT BEAM DEFLECTION MEANS INCLUDING WEDGE-SHAPED PRISM

[75] Inventors: Kunikazu Ohnishi, Chigasaki; Tohru Sasaki, Yokohama; Masayuki Inoue, Yokohama; Michio Miura, Yokohama; Akira Saito, Odawara; Kazuo Shigematsu, Saitama, all of Japan

[73] Assignee: Hitachi, Ltd., Tokyo, Japan

[21] Appl. No.: 878,974

[22] Filed: May 6, 1992

[30] Foreign Application Priority Data

May 10, 1991 [JP] Japan .................................. 3-105537

[51] Int. Cl.$^5$ ............................. G11B 7/00; G11B 7/09
[52] U.S. Cl. ................................ 369/44.14; 369/44.38; 369/112
[58] Field of Search .................. 369/112, 44.37, 44.38, 369/44.23, 44.24, 110, 44.14, 44.25, 44.13; 359/831, 833, 837, 211, 369, 640, 554, 557

[56] References Cited

U.S. PATENT DOCUMENTS

| | | | |
|---|---|---|---|
| 4,074,085 | 2/1978 | Russell | 369/112 |
| 4,700,336 | 10/1987 | Yoshida et al. | 369/44.38 |
| 5,031,165 | 7/1991 | Fujita | 369/44.13 |
| 5,068,843 | 11/1991 | Takeshita et al. | 369/44.37 X |
| 5,161,243 | 11/1992 | Ishida et al. | 369/44.37 X |

FOREIGN PATENT DOCUMENTS 0092144 4/1987 Japan .

OTHER PUBLICATIONS

Ishida et al., "Two Laser Optical Head and its Application" Optical Memory Symposium '86 pp. 121-126.

Primary Examiner—Andrew L. Sniezer
Assistant Examiner—Thang V. Tran
Attorney, Agent, or Firm—Antonelli, Terry, Stout & Kraus

[57] ABSTRACT

An optical recording/reproducing apparatus includes a plurality of semiconductor lasers, an objective lens for focusing light beams from the semiconductor lasers on an optical disk to form a plurality of light spots, and a correction unit for reducing an offset in a tracking signal occurring concomitantly with relative position correction for the light spots. The correction unit includes a rotary wedge-shaped prism disposed in an optical path through which a laser beam incident on the optical disk and a reflection laser beam from a light spot on the disk pass in opposite directions. The shape, refractive index and initial installation angle of the wedge-shaped prism are designed to have predetermined values that cancel the position shift of the laser beam on the objective lens surface occurring concomitantly with deflection of the laser beam.

8 Claims, 7 Drawing Sheets

OPTICAL RECORDING/REPRODUCING APPARATUS WITH LIGHT BEAM DEFLECTION MEANS INCLUDING WEDGE-SHAPED PRISM

BACKGROUND OF THE INVENTION

The present invention relates to an optical recording-/reproducing apparatus for performing recording, reproduction and erase of signals and more particularly to an optical recording/reproducing apparatus provided with an optical correction means for stably positioning an optical spot at a predetermined position.

In the past, proposed as an optical recording/reproducing apparatus for irradiating two or more light spots on an optical recording medium by means of an objective lens are, for example, an apparatus in which a signal is recorded and reproduced by one light spot and erasing is effected by another light spot and an apparatus in which a signal already recorded is erased by one light spot while a new signal is recorded concurrently by the one light spot and recorded signal is reproduced by another light spot.

The optical recording/reproducing apparatuses described above require a light spot relative position correction means for maintaining the relative position between the two light spots highly accurately and stably. For example, JP-A-62-92144 discloses a method for realization of this type of relative position correction means.

According to the aforementioned method, for one of two light spots (hereinafter referred to as a first light spot), a reflection light beam from an optical recording medium is led to a predetermined photodetector to produce a tracking signal based on which an objective lens is moved to perform tracking control. At that time, for the other light spot (hereinafter referred to as a second light spot), a reflection light beam from the optical recording medium is led to another photodetector to produce a tracking signal based on which a wedge-shaped prism disposed immediately after a collimating lens is rotated in order that the deflection angle of a light beam (hereinafter referred to as a second light beam) passing through the prism and reaching the objective lens is controlled to perform position correction through which the relative position of the second light spot to the first light spot can always be kept to be constant.

Accordingly, through the use of the relative position correction means as above, accuracy of irradiation positions can be maintained for each of the plurality of light spots. Additionally, the sensitivity of the inclination angle of the light beam to the rotation angle of the wedge-shaped prism can be designed to be sufficiently low and therefore correction which is stable against external shock can be ensured.

SUMMARY OF THE INVENTION

An object of the present invention is provide an optical recording/reproducing apparatus which is excellent in signal recording, reproduction and/or erasing performance by making it possible to position a plurality of light spots for recording, reproduction and erasing of signals highly accurately and stably at predetermined positions.

The prior art apparatus has excellent performance as described above, but it has disadvantages as described below. Firstly, when in the prior art apparatus the second light beam to be incident on the objective lens is deflected from the initial state as the wedge-shaped prism rotates, a reflection light beam resulting from reflection of the second light beam at the optical recording medium is similarly deflected, so that a light spot of reflection light irradiated on the detector surface is disadvantageously shifted in the direction of tracking.

Secondly, when the second light beam to be incident on the objective lens is deflected, the incoming position of the second light beam incident on the objective lens is shifted correspondingly in the direction of tracking. Then, the light spot of reflection light irradiated on the predetermined photodetector surface is also shifted in the direction of tracking by the positional shift of the incoming light beam.

When the light spot on the photodetector surface is shifted in the tracking direction as described above, the detection signal produced from a typical tracking signal detection means such as a push-pull type undergoes an offset.

Especially, in the case of an optical recording/reproducing apparatus comprised of a stationary unit including a semiconductor laser light source and a rotary wedge-shaped prism for light spot relative position correction and a movable unit including an objective lens, which movable unit is separated from the stationary unit and is movable in the radial direction of a disk-shaped optical recording medium, the distance between the prism and objective lens is much larger than that of an integral type optical recording/reproducing apparatus and the shift amount of the light spot on the photodetector surface, due to the aforementioned positional shift of the incoming light beam, increases in proportion to an increase in the distance. Consequently, the offset of the tracking signal increases, raising a problem that highly accurate tracking control cannot be attained under the influence of an increased offset.

The object of the invention can be realized by an optical recording/reproducing apparatus having light spot relative position correction means which can greatly reduce the positional shift amount of light spot on the detector surface attributable to the aforementioned two kinds of causes so as to suppress the offset of tracking signal sufficiently and produce an excellent tracking signal.

The above object can be accomplished using the following means.

Firstly, the positional shift of the spot on the photodetector due to the aforementioned deflection of the reflection light beam can be eliminated by disposing light spot relative position correction means such as a rotary wedge-shaped prism in an optical path between a beam splitter for leading a reflection light beam from the optical recording medium to the photodetector and the objective lens.

Secondly, for the positional shift of the spot on the photodetector due to the positional shift of incoming light beam on the objective lens surface, a phenomenon is utilized in which concurrently with rotation of the wedge-shaped prism for light spot relative position correction and concomitant change of the deflection angle of the second light beam transmitting through the prism, the position at which the second light beam exits from the prism is shifted. In other words, the problem can be solved by determining the shape and structural dimensions of the wedge-shaped prism and the incident angle of the light beam in such a manner that the shift of the outgoing position at the prism cancels out a shift of the incoming light beam caused by a change in the deflection angle of light beam.

Limitations on the position of installation of the light spot relative position correction means will first be described.

When the light spot relative position correction means is disposed in an optical path between the beam splitter and objective lens, an incoming light beam emitted from the semiconductor laser light source and heading for the objective lens and a reflection light beam reflected at the optical recording medium and heading for the photodetector through the objective lens both pass through the light spot relative position correction means in opposite directions. Accordingly, a light beam once deflected by the light spot relative position correction means again passes, after being reflected at the optical recording medium, through the light spot relative position correction means in a direction opposite to that of the incoming light beam, so that it is returned to the original deflection direction and reaches the photodetector. As a result, the positional shift of the light spot on the photodetector surface due to the rotary wedge-shaped prism can be cancelled completely.

Figure 2:
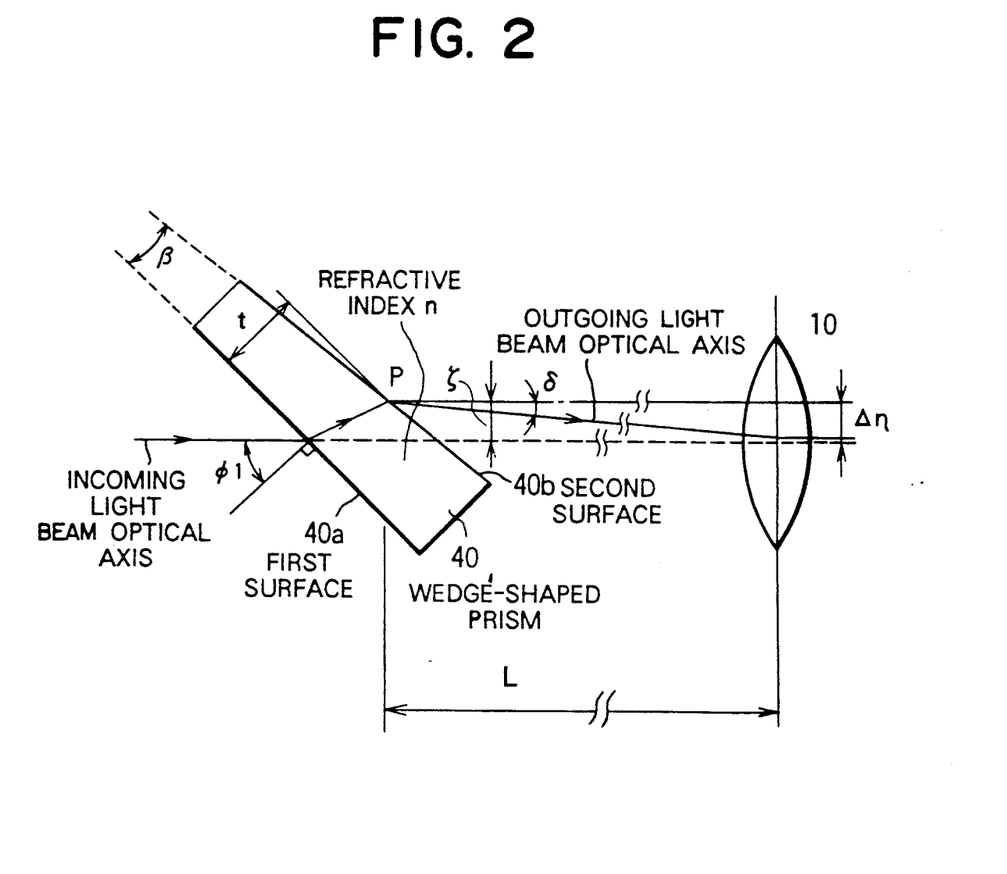
FIG. 2 is a diagram for explaining a rotary wedge-shaped prism of the invention.
Figure 3:
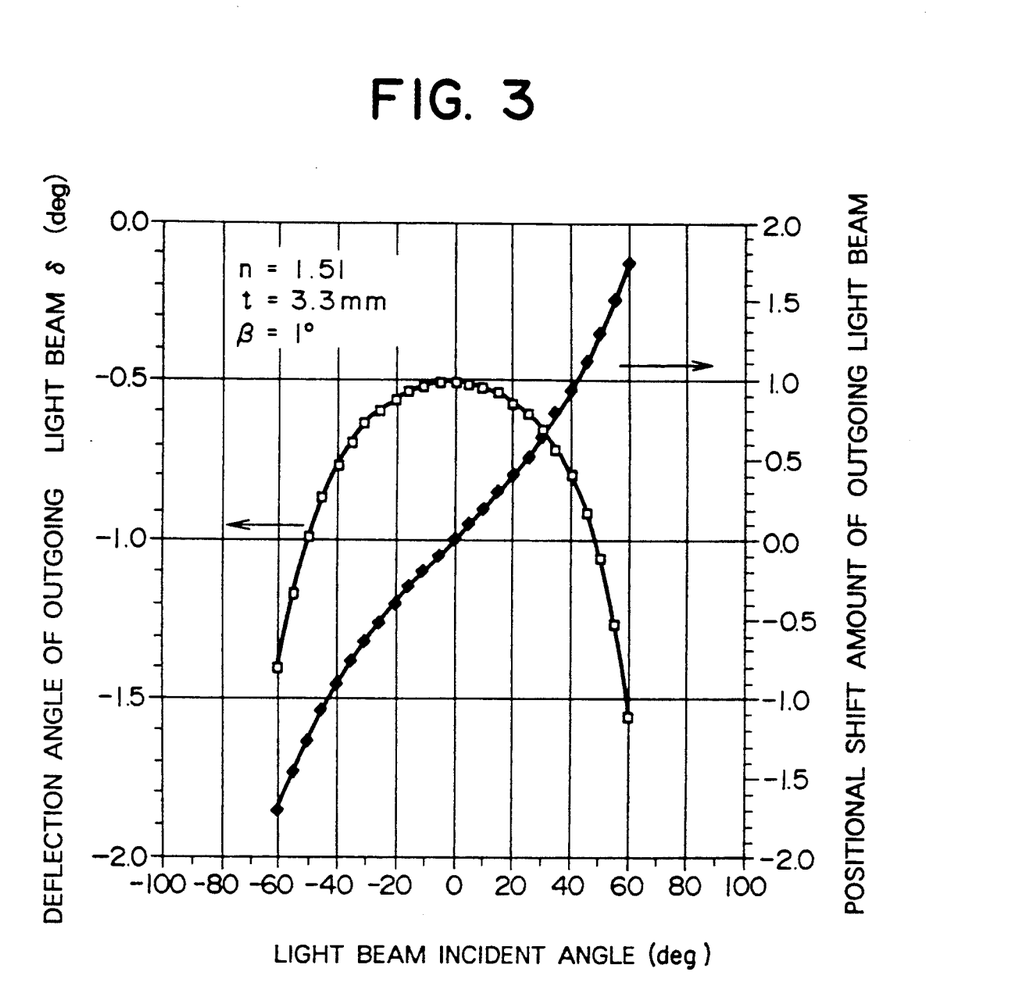
FIG. 3 is a graph useful in explaining characteristics of the rotary wedge-shaped prism of the invention.

Referring now to FIGS. 2 and 3, the operation for reducing the positional shift of the spot on the detector surface due to the rotary wedge-shaped prism will be described.

FIG. 2 shows a rotary wedge-shaped prism for light spot relative position correction used in the present invention. When a light beam passes through the wedge-shaped prism 40, an angle $\delta$ (hereinafter referred to as the deflection angle of the outgoing light beam) between the heading direction of an incoming light beam incident on a first surface 40a of the wedge-shaped prism 40 and the heading direction of an outgoing light beam exiting from a second surface 40b changes with and incident angle $\phi 1$ of the incoming light beam incident on the first surface 40a of the wedge-shaped prism 40, as indicated by the following equation (1):

$$\delta = \sin^{-1}[n \cdot \sin\{\beta + \sin^{-1}[n^{-1} \cdot \sin \phi 1]\}] - (\phi 1 + \beta) \quad (1)$$

where $\beta$ is the angle between the first surface (light beam incident surface 40a) and second surface (light beam outgoing surface 40b) of the wedge-shaped prism and n is the refractive index of the prism.

Thus, by rotating the prism about a rotary axis vertical to the sheet of the drawing to change the incident angle, the outgoing light beam can be deflected in a direction of the arrow in the figure (namely, in a plane parallel to the sheet of the drawing). At that time, a shift amount $\Delta\eta$ of a light beam incident position on the objective lens surface concomitant with the deflection of the outgoing light beam from the prism (namely, an incoming light beam incident on the objective lens 10) can be indicated by the following equation (2):

$$\Delta\eta = L \cdot \tan \delta \quad (2)$$

where $\delta$ is the deflection angle of the outgoing light beam from the prism and L is the distance between prism 40 and objective lens 10.

On the other hand, the distance $\zeta$ between an outgoing point P of the optical axis when the outgoing light beam exits from the prism and the axis of the incoming light beam changes with the incident angle $\phi 1$ of light beam on the first surface 40a of the prism 40 as indicated by the following equation (3):

$$\zeta = t \cdot (1 - \cos\phi l / \sqrt{n^2 - \sin^2\phi l})\sin\phi l \quad (3)$$

where t represents the distance between the first and second surfaces of the prism. As is clear from this equation, when the prism is rotated by an angle $\theta$ from a reference light beam outgoing position at which the initial state of the prism is set (light beam incident angle=$\phi$o) and then the light beam incident angle $\phi 1$ takes a value of $\phi$o+$\theta$, the shift amount $\Delta\xi$ of the light beam outgoing position is indicated by the following equation(4):

$$\Delta\zeta = t \cdot \{(1 - \cos\phi l / \sqrt{n^2 - \sin^2\phi l})\sin\phi l - \quad (4)$$

$$(1 - \cos\phi o / \sqrt{n^2 - \sin^2\phi o})\sin\phi o\}$$

For example, in case where a wedge shaped prism having $\beta = 1°$, n=1.51 and t=3.3 mm in equations (1) and (3) is used, the relation of the deflection angle $\delta$ of the outgoing light beam from the prism and the shift amount $\Delta\xi$ to the light beam incident angle $\phi 1$ is obtained as shown in FIG. 3.

In FIG. 3, abscissa $\phi 1$ is designated to be positive for counterclockwise rotation of the wedge-shaped prism 40 around the axis perpendicular to the figure relative to the optical axis of the incoming light beam as shown in FIG. 2. An ordinate $\delta$ is designated to be positive for counterclockwise rotation of the optical axis of the outgoing light beam around the axis perpendicular to the figure relative to the optical axis of the incoming light beam. The other ordinate representative of the outgoing position shift amount $\Delta\xi$ is positive when the outgoing point P is shifted upwardly from the optical axis of the incoming light beam.

As is clear from FIG. 3, when a light beam is transmitted through the above wedge-shaped prism, the deflection direction (deflection angle $\delta$) of the outgoing light beam from the prism is the same regardless of the incident direction (positive or negative incident angle $\phi 1$). It is to be noted that in the illustrated example, $\Delta$ is always negative.

Contrary to this, the shift amount $\Delta\xi$ of the outgoing position coincides, in polarity, with the incident angle $\phi 1$. For example, when the incident angle $\phi 1$ is changed positively in the example of FIG. 3, the outgoing position of the outgoing light beam from the prism and the light beam incident position subject to the deflection of the outgoing light beam from the prism are shifted in opposite directions. Accordingly, when the above wedge-shaped prism is used, a substantial shift amount $\Delta\epsilon$ of the light beam incident position on the objective lens surface concomitant with the deflection of the outgoing light beam is represented by the difference between the shift amount $\Delta\eta$ and the shift amount $\Delta\xi$ of the position of the outgoing light beam from the prism, which difference depends on the deflection of the outgoing light beam from the prism, and is indicated by the following equation (5):

$$\Delta\epsilon = \Delta\eta - \Delta\xi = L \cdot \tan \delta - \Delta\xi \quad (5)$$

It can be seen from the foregoing discussion that by designing the angle β between the first and second surfaces of the rotary wedge-shaped prism for light spot relative position correction, its surface distance t and its refractive index n as well as the initial incident angle of the light beam incident on the prism i.e., its initially set angle φo and its rotation angle θ(φo+θ), the substantial shift amount Δε of the light beam incident position on the objective lens surface can be decreased significantly, and as a result the spot positional shift on the detector surface can also be decreased significantly.

According to the invention, an optical recording/reproducing apparatus can be obtained which can perform recording, reproduction and erasing stably with high accuracy by providing relative position correction means capable of a sufficiently reducing the offset of a tracking control signal generated concomitantly with the positional correction of light spot.

DESCRIPTION OF THE PREFERRED EMBODIMENTS

Figure 1:
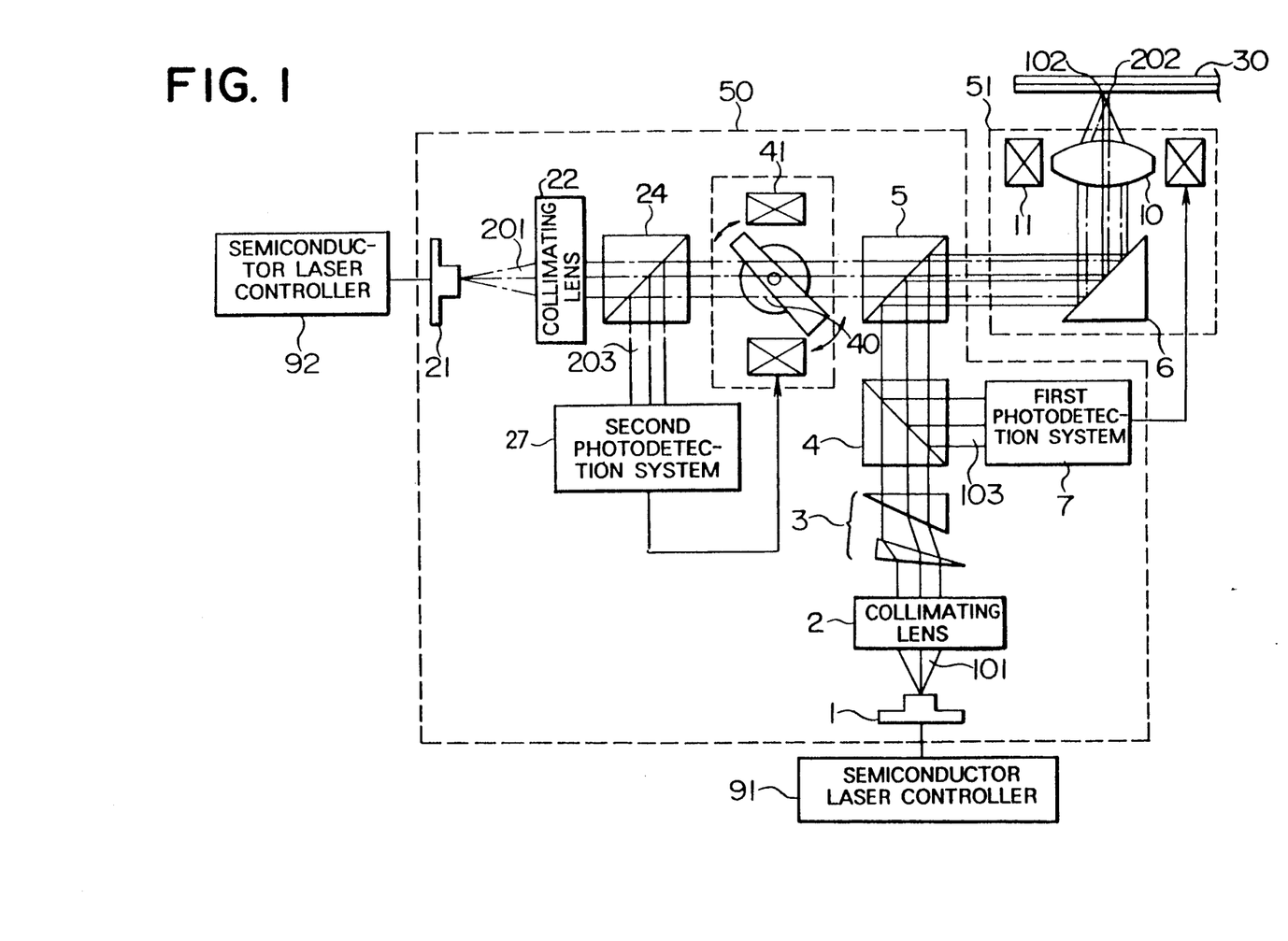
FIG. 1 is a schematic diagram showing a construction of an embodiment of the invention.

FIG. 1 shows an embodiment of the invention. In FIG. 1, a first semiconductor laser 1 constituting a first light source emits a first light beam 101 having a wavelength λ1 and a second semiconductor laser 21 constituting a second light source emits a second light beam 201 having a wavelength λ2.

Firstly, the first light beam 101 emitted from the first semiconductor laser 1 is transformed by a collimating lens 2 into a parallel beam which passes through beam shaping prism 3, beam splitter 4, wavelength selective mirror 5 (operative to reflect the light beam of wavelength λ1 and transmit the light beam of wavelength λ2) and triangular mirror 6 for changing an optical path and impinges on an objective lens 10 applied with chromatic aberration correction with respect to wavelengths λ1 and λ2. Then, the objective lens 10 forms a first light spot 102 on a recording track of a disk-shaped optical recording medium (hereinafter referred to as an optical disk) 30. A reflection beam 103 of the first light spot 102 reflected at the optical disk 30 also passes through the objective lens 10, triangular mirror 6 and wavelength selective mirror 5 and is reflected at the beam splitter 4 to impinge on a first photodetection system 7. The first photodetection system 7, based on a known detection method and comprised of known optical parts (not shown), produces a focus and tracking control signal for the light spot 102. The control signal is fed back to an objective lens actuator 11 connected to the objective lens 10 to control displacement of the objective lens 10 in the optical axis direction and in the radial direction of the optical disk.

On the other hand, the second light beam 201 emitted from the second semiconductor laser 21 is transformed by a collimating lens 22 into a parallel beam which passes through beam splitter 24 and rotary wedge-shaped prism 40 for light spot relative position correction according to the invention and passes through the wavelength selective mirror 5 to impinge on the objective lens 10 after traveling along the same optical path as the first light beam 101. Then, the objective lens 10 forms a second light spot 202 at a position on optical disk 30 which is close to the first light spot 102. A reflection beam 203 of the second light spot 202 reflected at the optical disk 30 also passes through the objective lens 10, triangular mirror 6 and wavelength selective mirror 5 and thereafter passes through the rotary wedge-shaped prism 40 in a direction opposite to that of the incident light beam 201 to reach the beam splitter 24. Then, the reflection beam 203 is reflected at the beam splitter 24 and subsequently it impinges on a second photodetection system 27. The second photodetection system 27, based on the known detection method and comprised of known optical parts (not shown) as in the case of the first photodetection system 7, produces a focus and tracking control signal and a signal representative of information recorded on the optical disk 30. (Specific constructions of the first and second photodetection systems have no direct relation to the present invention and will not be described herein.)

The first and second semiconductor lasers 1 and 21 are controllably driven by semiconductor laser control means 91 and 92, respectively. When data is stored or erased in the optical disk by using the semiconductor laser 1 or 21, the semiconductor laser used is modulated by the control means 91 or 92.

Additionally, the optical recording/reproducing apparatus of the present embodiment is divided into a movable unit 51 comprised of the objective lens 10, objective lens actuator 11 and triangular mirror 6 and a stationary unit 50 including the remaining optical parts, and only the movable unit 51 is movable in the radial direction of the optical disk 30.

In the embodiment of FIG. 1, the rotary wedge-shaped prism 40 disposed in the optical path for the second light beam 201 is provided with a prism actuator 41 operative to rotate the wedge-shaped prism 40 about a Z axis (an axis vertical to the sheet of the drawing). Through the aforementioned control of displacement of the objective lens 10, the second light spot 202 is displaced on the optical disk follow the first light spot 102. Accordingly, the tracking control signal for the second light spot 202 which is obtained from the second photodetection system 27 corresponds to a position shift of the second light spot 202 relative to the first light spot 102. Therefore, by feeding back this tracking control signal to the prism actuator 41 so that the wedge-shaped prism may be rotated by a predetermined angle to change the deflection angle of the second light beam incident on the objective lens as described previously, the second light spot 202 can be displaced by a small amount in the tracking direction (radial direction of the optical disk 30) to correct the relative position shift.

Figure 4:
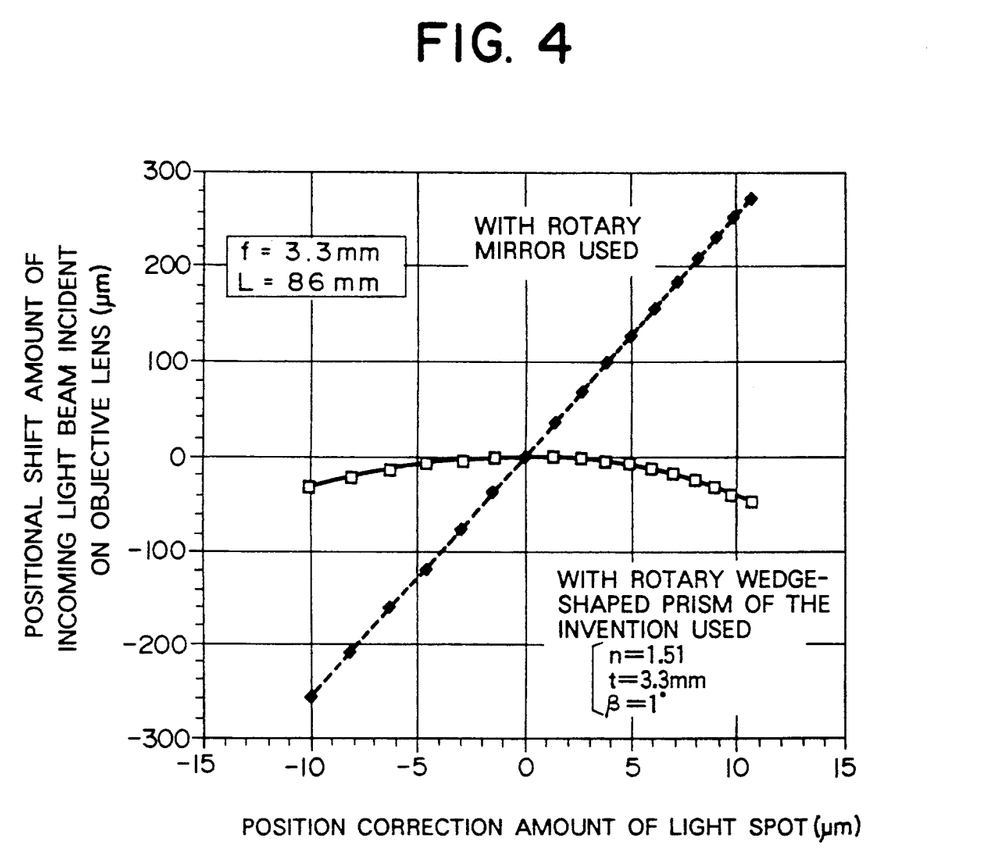
FIG. 4 is a graph useful in explaining beam position shift amounts in an optical recording/reproducing apparatus of the invention and of the prior art.

FIG. 4 shows an example of results of calculation of the relation between the position correction amount of the light spot 202 (the spot moving amount on shift amount Δε occurring on the surface of the objective lens 10 concomitantly with the position correction amount. The solid curve represents an instance where a rotary wedge-shaped prism 40 ($\beta=1°$, n=1.51, t=3.3 mm) is so positioned as to have an incident light beam incoming angle $\phi 1$ of 45°. The dotted curve represents an instance where in place of the rotary wedge-shaped prism 40, a conventional rotary mirror, is used as the light spot relative position correction means. In the calculation, it is assumed that the objective lens 10 has a focal distance f of 3.3 mm and the distance L between the objective lens 10 and the rotary wedge-shaped prism 40 or rotary mirror is 85 mm (on the assumption that the aforementioned separation type optical head is used).

As is clear from FIG. 4, by using a rotary prism which is designed to have a predetermined shape, structural dimensions and installation angle on the basis of the previously-described equations, the position shift amount of the incoming light beam on the objective lens surface can be made to be less than 50 μm within a range of the light spot moving amount which is from −5 μm to +5 μm. This position shift amount is less than ½ of that obtained with the conventional rotary mirror. As a result, the tracking offset due to the incoming light position shift on the surface of the objective lens 10 can be reduced sufficiently. For example, in the embodiment illustrated in FIG. 4, the position shift amount of the incoming light beam on the objective lens surface can be made to be less than 10 μm within the range of the moving amount of the light spot which is from −5 μm to +5 μm. This position shift amount is less than 1/10 of that of the conventional apparatus.

Additionally, in the embodiment shown in FIGS. 1 and 4, the prism rotation angle necessary to move the light spot on the optical disk 30 by 1 μm is about 0.8°, proving that the present apparatus has a very low sensitivity as compared to the conventional rotary mirror type. It is necessary that the second light spot 202 applied with light spot relative position correction be so moved as to substantially follow the first light spot 102 through the control of displacement of the objective lens 10 and that the light spot relative position correction have the function of correcting a slight time-varying position shift of the second light spot relative to the first light spot. Accordingly, as in the case of the rotary wedge-shaped prism 40 of the present invention, the correction means preferably has a low sensitivity to ensure stable correction even under the application of external shock.

For rotation of the wedge-shaped prism 40, a rotary type actuator using a magnetic circuit or a piezoelecrtric device may be used as the rotation means 41. This can be realized utilizing known techniques and will not be detailed herein.

Figure 5:
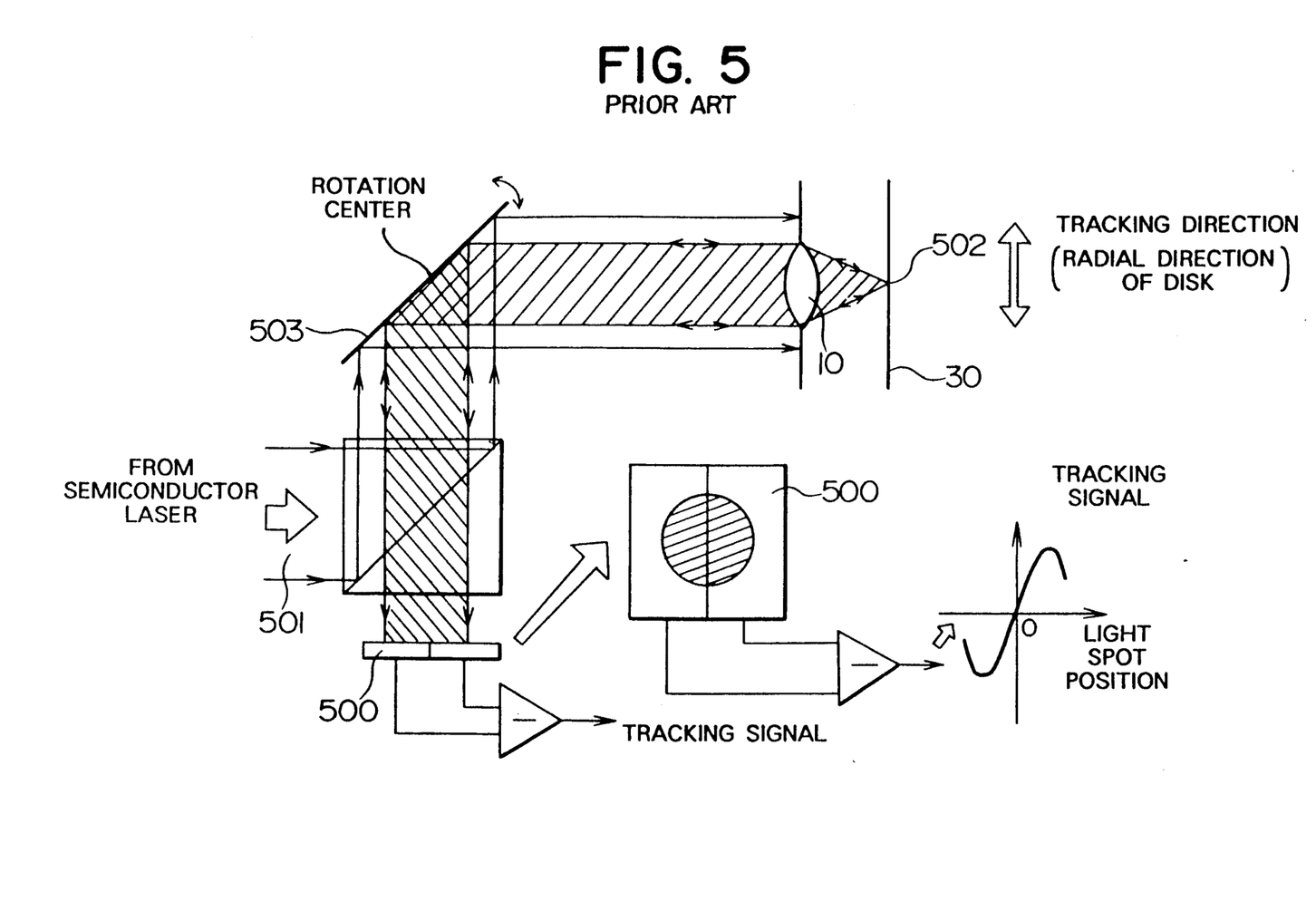
FIG. 5 is a diagram for explaining a positional relation between a two-division photodetector and a light beam for detecting a tracking signal according to a conventional tracking control apparatus.
Figure 6:
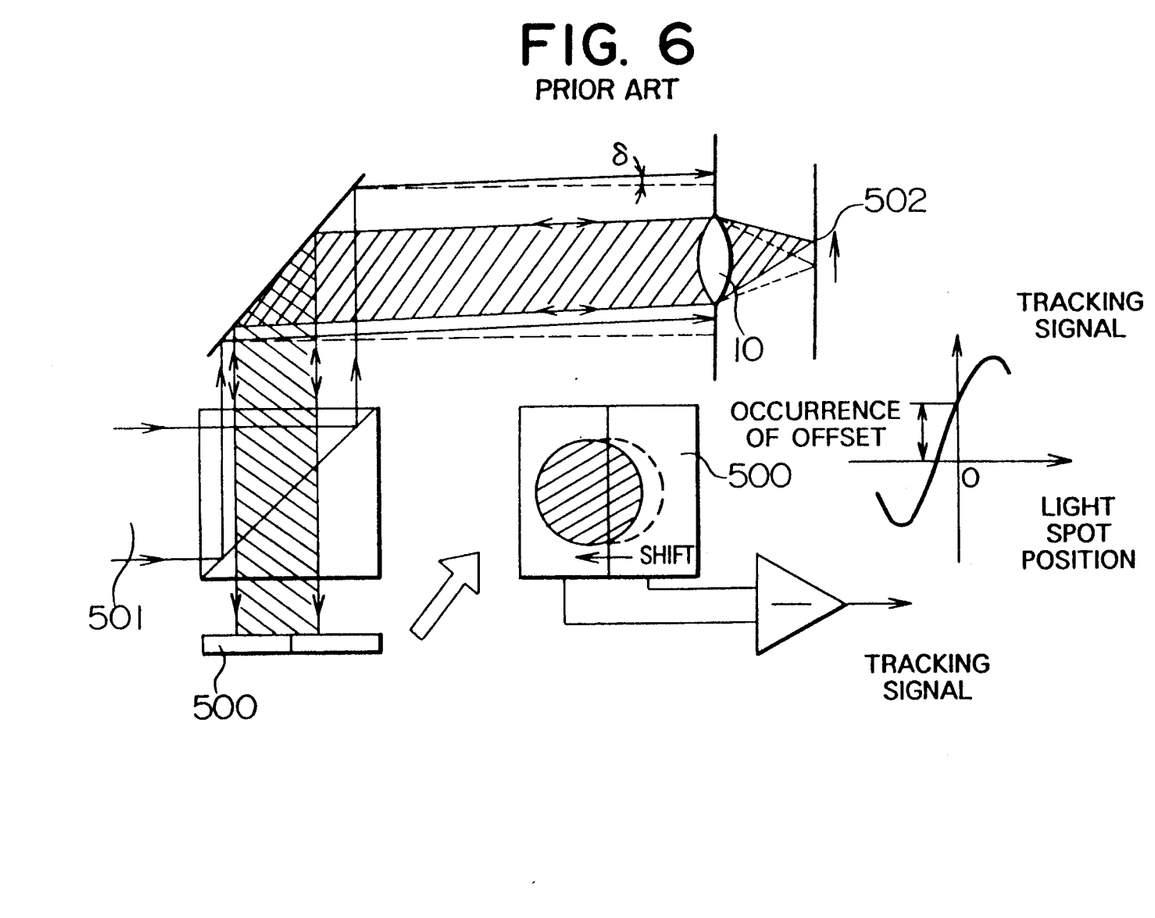
FIG. 6 is a diagram for explaining the state where the light spot is displaced in the FIG. 5 conventional unit.
Figure 7:
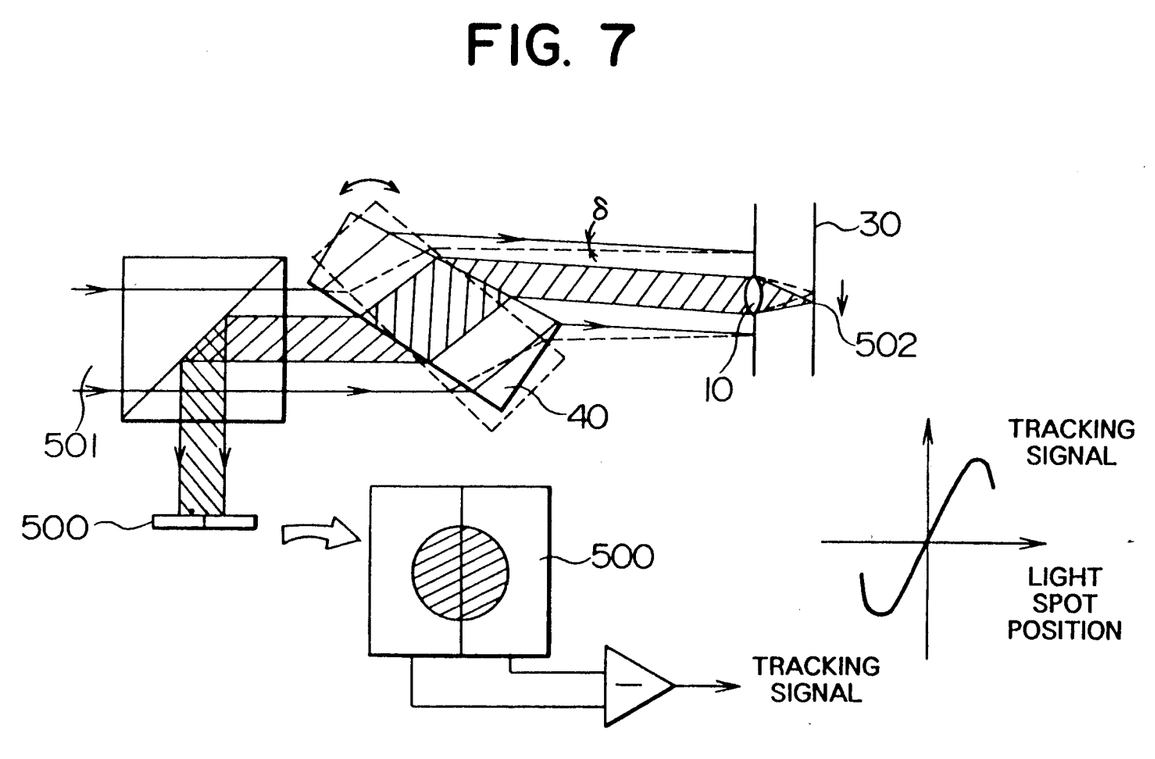
FIG. 7 is a diagram for explaining a positional relation between a two-division photodetector and a light beam according to the invention.

Further, for better understanding of the present invention, the tracking detection apparatus according to the invention will be described in comparison with the conventional apparatus with reference to the schematic diagrams of FIGS. 5 to 7. As an example, a push-pull type tracking detection apparatus will be described. A schematic diagram of FIG. 5 is useful to explain the conventional tracking detection apparatus. In the conventional apparatus, a semiconductor laser light beam 501 is reflected by rotary mirror 503 and objective lens 10 and focused into a light spot 502 on the surface of a disk 30. A reflection beam of the light spot 502 passes through the objective lens 10 to impinge on a two-division photodetector 500. In FIG. 5, the light beam is incident on the center of the two-division detector 500 and hence no offset occurs in the detected tracking signal. A schematic diagram of FIG. 6 is useful to explain the state wherein the light spot 502 is displaced in the tracking direction in the conventional apparatus. A reflection beam of the light spot 502 impinges on the two-division detector 500 at a position significantly displaced from the center of the detector. Thus, when in the conventional apparatus the light spot 502 is displaced in the tracking direction, a significant offset occurs in the tracking signal. A schematic diagram of FIG. 7 is useful to explain the tracking detection apparatus according to the invention. In the apparatus of FIG. 7, a semiconductor laser beam 501 is passed through wedge-shaped prism (trapezoidal prism) 40 and objective lens 10 and focused into a light spot 502 on the surface of disk 30. When in the apparatus of FIG. 7 the wedge-shaped prism 40 is rotated, the optical axis is deflected to displace the light spot 502. Accordingly, the flux of the light incident on the objective lens 10 is not shifted. The flux of the light reflected from the disk 30 will not impinge on a position displaced from the center of two-division detector 500. Therefore, in the tracking detection apparatus of the invention, even when the light spot 502 is displaced, no tracking offset occurs to permit highly accurate and stable tracking control.

While in the embodiment shown in FIG. 1 the two light spots 102 and 202 are irradiated on the optical disk 30, an apparatus in which three or more light spots are irradiated can obviously use the light spot relative position correction means of the present invention. In this case, for one of the irradiated light spots (this light spot will be called a main spot), positional control may be effected through control of displacement of the objective lens and the rotary wedge-shaped prism of the invention may be provided in optical paths of the other light spots to produce tracking control signals used to effect position correction of the other light spots relative to the main spot.

The foregoing embodiments have been described as being an example of correcting relative position between two or more light spots, but obviously the invention may be applied to a light spot subjected to positional control in the tracking direction by means of the objective lens actuator (light spot 102 in the example of FIG. 1). More specifically, a rotary wedge-shaped prism 40 of the invention and a prism actuator 41 may be disposed in an optical path for the light beam 101 within the stationary unit 50 so as to perform tracking control of the light spot 102. With this construction, the objective lens actuator 11 for tracking control provide in the movable unit 51 can be omitted to reduce weight of the movable unit, thereby attaining the significant effect of reducing access time for the movable unit.

We claim:

1. An optical recording/reproducing apparatus comprising:
   semiconductor laser light sources;
   an objective lens for focusing light beams emitted from said semiconductor laser light sources on an optical recording medium to form light spots;
   photodetectors for detecting refection light beams of said light spots from said optical recording medium;

beam splitters for leading said reflection light beams or transmission light beams to said photodetectors; and light beam deflection means including a wedge-shaped prism disposed in an optical path between one of said beam splitters and said objective lens and having a first surface on which one of said light beams is incident and a second surface from which said one light beam exits, said first and second surfaces not being parallel to each other, said wedge-shaped prism having a predetermined shape, a predetermined installation angle, and a predetermined refractive index which are selected to substantially cancel out a displacement of an outgoing optical axis position of said one light beam exiting from said second surface occurring concomitantly with rotation of said wedge-shaped prism and a displacement of an incoming optical axis position of said one light beam incident on said objective lens occurring concomitantly with a deflection of said one light beam, and means responsive to a predetermined control signal produced by one of said photodetectors for rotating said wedge-shaped prism about a rotary axis substantially parallel to said first and second surfaces.

2. An optical recording/reproducing apparatus according to claim 1, comprising at least two semiconductor laser light sources for emitting light beams which are focused on predetermined mutually close positions on said optical recording medium to form independent light spots, photodetectors for separately detecting reflection light beams of said light spots from said optical recording medium, wherein said light beam deflection means is disposed in an optical path of at least one of said light beams.

3. An optical recording/reproducing apparatus according to claim 1, comprising a stationary unit including at least said semiconductor laser light sources, photodetectors and light beam deflection means and a movable unit including said objective lens, wherein only said movable unit is movable in a radial direction of a disk-shaped optical recording medium.

4. An optical recording/reproducing apparatus according to claim 1, wherein in said wedge-shaped prism included in said light beam deflection means, an angle between said first and second surfaces is less than 3° and an angle between a normal of said first surface and an optical axis of said one light beam incident on said first surface is from 30° to 60°.

5. An optical recording/reproducing apparatus comprising:

a first semiconductor laser for outputting a first laser beam;

a second semiconductor laser for outputting a second laser beam;

an optical recording medium for recording, reproducing and/or erasing information in response to said first and second laser beams;

an objective lens for focusing said first and second laser beams on positions on said optical recording medium to form first and second light spots, respectively;

first photodetection means for detecting the first laser beam reflected at said first light spot;

objective lens drive means for driving said objective lens to control a position of said first light spot;

second photodetection means, including a two-division detector, for detecting the second laser beam reflected at said second light spot; and light beam deflection means for deflecting said second light beam to control a positional displacement of said second light spot on said optical recording medium and including a wedge-shaped prism disposed on an optical path of said second laser beam between said second semiconductor laser and said objective lens as well as between said objective leans and said second photodetection means, said wedge-shaped prism being rotatable by a drive unit and having first and second surfaces which are not parallel with each other, and when rotated by said drive unit on the basis of a signal produced by said second photodetection means, receiving said second laser beam at said first surface, outputting said second laser beam from said second surface, and deflecting an optical axis of said second laser beam incident on said objective lens to control the positional displacement of said second light spot on said optical recording medium, said wedge-shaped prism being designed to have a thickness, a refractive index, and an angle between said first and second surfaces which satisfy a predetermined relation to substantially cancel out a displacement $\Delta\xi$ of an outgoing position of said second laser beam at said second surface generated by rotation of said wedge-shaped prism and a displacement $\Delta\eta$ of a position of said second laser beam incident of said objective lens which is generated by a deflection of the optical axis of said second laser beam, and to reduce an error in the signal produced by said second photodetection means by reducing a displacement of said second laser beam incident on said two-division detector generated by the rotation of said wedge-shaped prism.

6. An optical recording/reproducing apparatus according to claim 5, wherein the displacement $\Delta\eta$ of the position of said second laser beam incident on said objective lens and the displacement $\Delta\xi$ of the outgoing position of said second laser beam at said second surface of said wedge-shaped prism satisfy the relation $$[\Delta\epsilon =]|\Delta\eta - \Delta\xi| < 50 \ \mu m$$

when the positional deviation of said second light spot on said optical recording medium is between $-5 \ \mu m$ and $5 \ \mu m$ and an incident angle of the second laser beam from said second semiconductor laser on said first surface of said wedge-shaped prism is changed form $\phi 1$ to $\phi 1$, wherein $$\Delta\eta = L \cdot \tan \delta$$

$$\delta = \sin^{-1}[n \cdot \sin[\beta + \sin^{-1}[n^{-1} \cdot \sin\phi l]]] - (\phi l + \beta)$$

$$\Delta\zeta = t \cdot \{(1 - \cos\phi l / \sqrt{n^2 - \sin^2\phi l})\sin\phi l -$$

$$(1 - \cos\phi o / \sqrt{n^2 - \sin^2\phi o})\sin\phi o\}$$

wherein n is the refractive index of said wedge-shaped prism, t is a thickness of said wedge-shaped prism $\beta$ is an angle between said first and second surfaces of said wedge-shaped prism, L is a distance between said wedge-shaped prism and said objective lens, $\delta$ is a deflection angle of said second laser beam exiting from said second surface of said wedge-shaped prism, and $\xi$ is a distance between the outgoing position of said second laser beam at sad second surface of said wedge-shaped prism and an optical axis of said second laser beam incident on said first surface.

7. An optical recording/reproducing apparatus according to claim 6, wherein $\Delta\eta$ and $\Delta\xi$ satisfy the relation $|\Delta\eta - \Delta\xi| < 20$ $\mu$m.

8. An optical recording/reproducing apparatus according to claim 5, wherein said light beam deflection means deflects said second light beam such that said second light spot moves in a direction perpendicular to a recording track on said optical recording medium in order to control the positional displacement of said second light spot on said optical recording medium.

* * * * *